United States Patent
Kavalar

(10) Patent No.: US 11,940,793 B1
(45) Date of Patent: Mar. 26, 2024

(54) VEHICLE COMPONENT VALIDATION USING ADVERSE EVENT SIMULATION

(71) Applicant: Zoox, Inc., Foster City, CA (US)

(72) Inventor: Andraz Kavalar, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 340 days.

(21) Appl. No.: 17/187,721

(22) Filed: Feb. 26, 2021

(51) Int. Cl.
*G05D 1/00* (2006.01)
*B60W 60/00* (2020.01)
*G05B 17/02* (2006.01)
*G05D 1/02* (2020.01)

(52) U.S. Cl.
CPC ......... *G05D 1/0088* (2013.01); *B60W 60/001* (2020.02); *G05B 17/02* (2013.01); *G05D 1/0276* (2013.01)

(58) Field of Classification Search
CPC . G05D 1/0088; G05D 1/0276; B60W 60/001; G05B 17/02
See application file for complete search history.

(56) References Cited

U.S. PATENT DOCUMENTS

2019/0235521 A1* 8/2019 Mudalige ............. G05D 1/0248
2020/0250363 A1* 8/2020 Partridge ............... G05B 17/02
2021/0004647 A1* 1/2021 Amirloo Abolfathi .. G06N 7/01
2021/0294944 A1* 9/2021 Nassar ................. B60W 50/00
2021/0389769 A1* 12/2021 Hari ...................... G01S 13/931

OTHER PUBLICATIONS

Zhiyuan Huang et al. "A Versatile Approach to Evaluating and Testing Automated Vehicles base on Kernel Methods," 2018. (Year: 2018).*

* cited by examiner

*Primary Examiner* — Anne Marie Antonucci
*Assistant Examiner* — Misa H Nguyen
(74) *Attorney, Agent, or Firm* — Lee & Hayes, P.C.

(57) ABSTRACT

Validating a component of an autonomous vehicle may comprise determining, via simulation, a likelihood that operation of the component will result in an adverse event. Such simulations may be based on log data developed from real world driving events to, for example, accurately model a likelihood that a scenario will occur during real-world driving. Because adverse events may be exceedingly rare, the techniques may include modifying a probability distribution associated the likelihood that a scenario is simulated, determining a metric associated with an adverse event (e.g., a likelihood that operating the vehicle or updating a component thereof will result in an adverse event), and applying a correction to the metric based on the modification to the probability distribution.

20 Claims, 8 Drawing Sheets

VEHICLE COMPONENT VALIDATION USING ADVERSE EVENT SIMULATION

BACKGROUND

Running simulations of scenarios may provide a valuable method for testing autonomous systems and/or machine-learned model pipelines, such as those incorporated in autonomous vehicles. However, as autonomous vehicle systems improve, situations that challenge the limits of the autonomous vehicle systems become rarer, making simulation less effective for testing autonomous vehicle components because a greater number of the simulations may be too simplistic to test the limitations of the systems. Additionally, effectively testing an autonomous vehicle component may require thousands or millions of simulations, which may take an enormous amount of computing bandwidth and time. This allocation of computing resources may increase the amount of time it takes to verify an update to a component, which may decrease the safety of the autonomous vehicle, and prevent other components from being tested.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
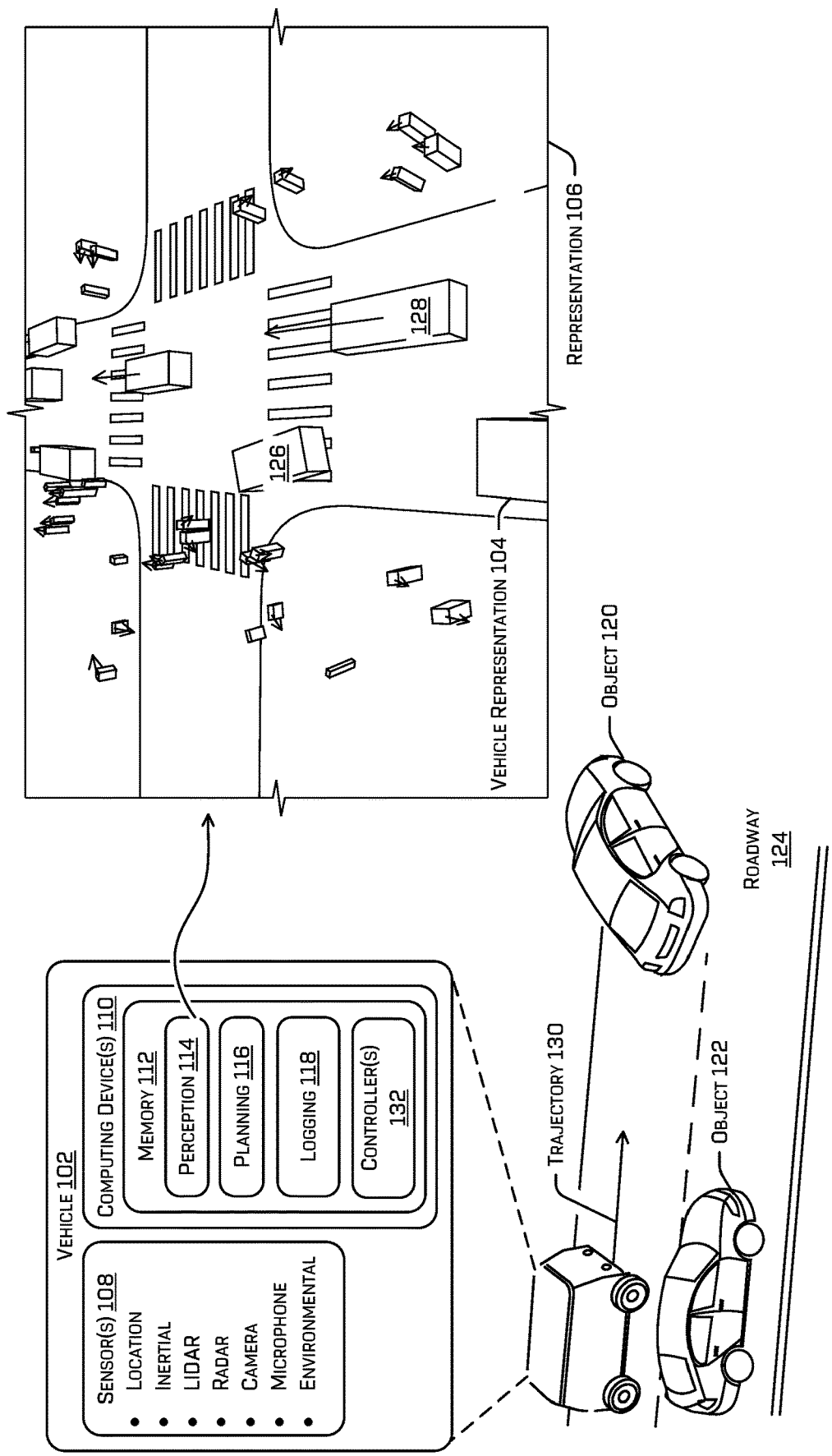
FIG. 1 illustrates an example scenario including an autonomous vehicle operating that may be modeled in a simulated scenario to verify component(s) of the autonomous vehicle.

Techniques for accurately validating a component of an autonomous vehicle may comprise determining, via simulation, a likelihood that operation of the component will result in an adverse event. Such an adverse event may include, for example, an impact with an object, failing to detect an object, or the like. Simulations may be based on log data developed from real world driving events to, for example, accurately model scenarios that may occur during real world driving. Such log data may not be rich with adverse events and corresponding external factors that may contribute to adverse events (which may be valuable for simulating autonomous vehicle reactions during simulation). The techniques discussed herein may overcome several increasing problems with using simulation to test and/or validate component(s) of an autonomous vehicle. For example, the number of simulations it takes to determine metric(s) indicating the safety and efficacy of a component may be in the thousands, hundreds of thousands, or millions of simulations to achieve a reasonable confidence interval (e.g., $\geq 90\%$, $\geq 95\%$, $\geq 98\%$, $\geq 99\%$). A confidence interval may be a likelihood (i.e., a posterior probability) that the safety or efficacy metric correctly describes operation of the component. In at least one example, the metric determined using the simulations may be a likelihood that using the component to operate the autonomous vehicle will result in an adverse event. In some examples, the component may be tested to validate that an adverse event is avoided using a simulation component. A confidence interval may be determined based at least in part on the simulations run - - - the confidence interval indicating a likelihood that the likelihood of the adverse event is correct.

As the component(s) of the autonomous vehicle improve, the number of scenarios that cause problems for the autonomous vehicle reduces. If simulations are run to test a component and no adverse events occur during the simulations, then the metric(s) calculated for the component may indicate that the component is perfect. However, the confidence interval may be low since no adverse events occurred—put colloquially, there may be no technical manner for determining whether the component is truly perfect or if one of those rare scenarios that gives the autonomous vehicle trouble wasn't part of the simulations. Moreover, neither a human or a computer may know what sorts of conditions might prove to result in an adverse event without random testing, which may waste time and effort.

To overcome this difficulty and increase the confidence interval, one could simply increase the number of simulations (potentially multiple magnitudes) in order to ensure that at least some adverse events would occur. However, simulations are computationally demanding and require extensive computational resources, which may prevent other component(s) from being tested.

The techniques discussed herein can increase a confidence interval associated with metric(s) determined using simulations for testing a component of a vehicle. The techniques may improve the testing and/or training of one or more components of the autonomous vehicle (e.g., a localization component, a perception component, a planning component) and may thereby improve the accuracy thereof and the safety and efficacy of operation of the autonomous vehicle.

Moreover, the techniques may increase the confidence interval without increasing the number of scenarios run and/or may decrease the number of scenarios to achieve (i.e., meet or exceed) a threshold confidence. Ultimately, the techniques may decrease the time and computational resources required to test and/or validate a component of a vehicle. In some instances, the techniques may enable live validation—if a developer or engineer makes a change to one of the components of the autonomous vehicle, the techniques described herein may notify the developer or engineer whether the change negatively affected the metric(s) associated with the component and/or whether the component would continue to be validated. A component may be validated if the metric and/or confidence interval determined from the simulation satisfies a threshold. For example, the metric may be a likelihood that operating the vehicle using the component will result in a collision, in which case the component may be validated if the likelihood is below (i.e., does not meet) a threshold likelihood and the confidence interval determined for the likelihood meets or exceeds a threshold confidence.

The techniques may include modifying the way a set of scenario parameters is selected from among multiple possible scenario parameters. In at least one example, the probability that the simulation system selects a particular set of scenario parameters may be identified by a distribution (e.g., a probability distribution function, a Gaussian mixture model (GMM)). The techniques may comprise modifying this distribution to increase a probability that the simulation system will select a set of scenario parameters that will result in the occurrence of an adverse event in a simulation generated from the selected set of scenario parameters. However, by modifying this distribution, the metric(s) determined for a component that's being tested could be skewed to show that the component is less safe or efficacious. The techniques may further comprise determining a correction factor to account for the modification of the distribution. A validation system may determine the metric(s) based at least in part on the correction factor and results of the simulations. By increasing the number of adverse events, the confidence interval determined by the validation system may be increased and the correction factor may ensure that the metric(s) determined by the validation system are accurate even though the distribution was modified according to the techniques discussed herein.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on a set of scenario parameters identifying characteristic(s) of the simulation, input received at a user interface of a computing device (e.g., a user of the computing device may define the environment, objects therein, and/or characteristics thereof), and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device (unillustrated in FIG. 1).

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle, such as the vehicle representation 104 in simulated representation 106. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 108 of the vehicle 102. For example, the sensor(s) 108 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 108 on the vehicle 102 and in a simulation, one or more of sensor(s) 108 may be simulated. In some examples, the position of a simulated sensor may correspond with a relative position of one of the sensor(s) 108 to the vehicle 102 and/or vehicle representation 104.

The sensor(s) 108 may generate sensor data, which may be received by computing device(s) 110 associated with the vehicle 102. However, in other examples, some or all of the sensor(s) 108 and/or computing device(s) 110 may be separate from and/or disposed remotely from the vehicle 102 and data capture, processing, commands, and/or controls may be communicated to/from the vehicle 102 by one or more remote computing devices via wired and/or wireless networks. During a simulation, the sensor data may be simulated based at least in part on a synthetic environment generated by the simulation system.

Computing device(s) 110 may comprise a memory 112 storing a perception component 114, a planning component 116, and/or a logging component 118. Note that, in some examples, the computing device(s) 110 may additionally or alternatively store a localization component, which may comprise software and/or hardware system(s) for determining a pose (e.g., position and/or orientation) of the vehicle 102 relative to one or more coordinate frames (e.g., relative to the environment, relative to a roadway, relative to an inertial direction of movement associated with the autonomous vehicle). The localization component may output at least part of this data to the perception component 114, which may output at least some of the localization data and/or use the localization data as a reference for determining at least some of the perception data.

The perception component 114 may determine what is in the environment surrounding the vehicle 102 (or during a simulation what is in the simulated environment) and the planning component 116 may determine how to operate the vehicle 102 (or control the vehicle representation 104 in a simulation) according to information received from the localization component and/or the perception component 114. The localization component, the perception component 114, and/or the planning component 116 may include one or more machine-learned (ML) models and/or other computer-executable instructions.

In some examples, the localization component and/or the perception component 114 may receive sensor data from the sensor(s) 108 and/or simulated data from a simulation system. In some instances, the perception component 114 may determine data related to objects (or simulated objects) in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the objects surrounding the vehicle 102 may be simulated objects of a simulated environment. The data produced by the perception component 114 may be collectively referred to as "perception data." Once the perception component 114 has generated perception data, the perception component 114 may provide the perception data to the planning component 116.

In some examples, simulations to validate a particular component may provide simulation data directly to that component. For example, to test the planning component 116, instead of providing simulated sensor data to the perception component 114, simulated perception data may be provided to the planning component 116 directly. This simulated perception data may be ground truth data, in at least one example. Additionally or alternatively, the vehicle system(s) may be tested as a whole by providing simulated sensor data to the localization component and/or perception component (e.g., to the system(s) that would be root nodes/furthest upstream during normative operation rather than providing simulated data to an intermediate component in the vehicle system).

During a real-world scenario, perception component 114 may detect object 120, a vehicle in the depicted example; object 122, another vehicle in the example; and/or characteristics of the roadway 124. During a simulation, perception component 114 may detect representation 126 and/or representation 128, where representation 126 may represent object 120 and representation 128 may represent object 122 in a simulation that reproduces the real-world scenario illustrated. Note that the depicted simulation representation 106 is a simplified simulation where different objects are represented as boxes and the depicted simulation representation 106 additionally includes additional simulated objects representing additional vehicles and pedestrians. It is understood that, instead of or in addition to a simplified simulation, the simulation may replicate real-world appearances.

When a perception component 114 detects an object, whether real or simulated, the perception component 114 may generate an object detection, which may comprise a data structure indicating one or more characteristics of the object. For example, the object detection may indicate a region of interest (ROI) associated with the object detection (e.g., a bounding box, mask, or other indication of a portion of sensor data associated with the object); a volume or area occupied by the object; a pose (e.g., position and/or orientation), velocity, acceleration, classification (e.g., vehicle, pedestrian, articulating vehicle, signage), etc. associated with the object, etc. The perception component 114 may associate an object detection with a track, which may indicate that the object has been previously detected and may comprise historical perception data and/or predicted perception data associated with the object. For example, the track may associate one or more object detections associated with a same object but different times.

According to the techniques discussed herein, the logging component 118 may determine log data comprising sensor data, perception data, scenario data, and/or planning data to store and/or transmit to a remote computing device (unillustrated in FIG. 1), as well as any other message generated and or sent by the vehicle 202 during operation including, but not limited to, control messages, error messages, etc. In some examples, a real-world vehicle 102 may transmit the log data to a remote computing device(s). The remote computing device(s) may identify one or more scenarios based at least in part on the log data, which may also comprise defining a scenario. For example, the remote computing device(s) may determine an environmental layout, a number, type, and a configuration of object(s) in the environment and/or associate this definition with one or more portions of log data associated with that scenario. The remote computing device(s) may determine a set of scenario parameter(s) to represent such characteristics of a scenario. Note that, although simulation scenarios may be determined from log data, they may also be defined based at least in part on user input, procedurally generated, or the like.

In some examples, the perception component 114 may comprise a prediction component that determines predicted data associated with an object, such as a predicted future position, orientation, velocity, acceleration, or the like. This predicted data and/or historical data associated with an object may be amalgamated as a track in association with the object. In some examples, the prediction data may be additionally or alternatively based at least in part on map data or other data. In some examples, the prediction data may comprise a top-down segmentation of the environment, as described in more detail in U.S. patent application Ser. No. 15/963,833, which is incorporated in its entirety herein, and/or a top-down prediction associated with the environment, as described in more detail in U.S. patent application Ser. No. 16/779,576, which is incorporated in its entirety herein.

The planning component 116 may determine a trajectory 130 based at least in part on the perception data and/or localization data (e.g., where the vehicle 102 is in the environment relative to a map and/or features detected by the perception component 114). For example, the planning component 116 may determine a route for the vehicle 102 from a first location to a second location; generate, substantially simultaneously and based at least in part on the perception data, a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 130 that the vehicle 102 may use to generate a drive control signal that may be transmitted to drive components of the vehicle 102 or, in a simulation, to control the vehicle representation 104 in the simulated environment.

FIG. 1 depicts an example of such a trajectory 130, represented as an arrow indicating a heading, velocity, and/or acceleration, although the trajectory itself may comprise instructions for a controller, which may, in turn, actuate a drive system of the vehicle 102. For example, the trajectory 130 may comprise instructions for controller(s) 132 of the autonomous vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated). The trajectory 130 may comprise a target heading, target steering angle, target steering rate, target position, target velocity, and/or target acceleration for the controller(s) to track. However, in a simulation, the trajectory may be used by a simulation system to control a position, orientation, velocity, acceleration, etc. of the simulated autonomous vehicle.

Example System

Figure 2:
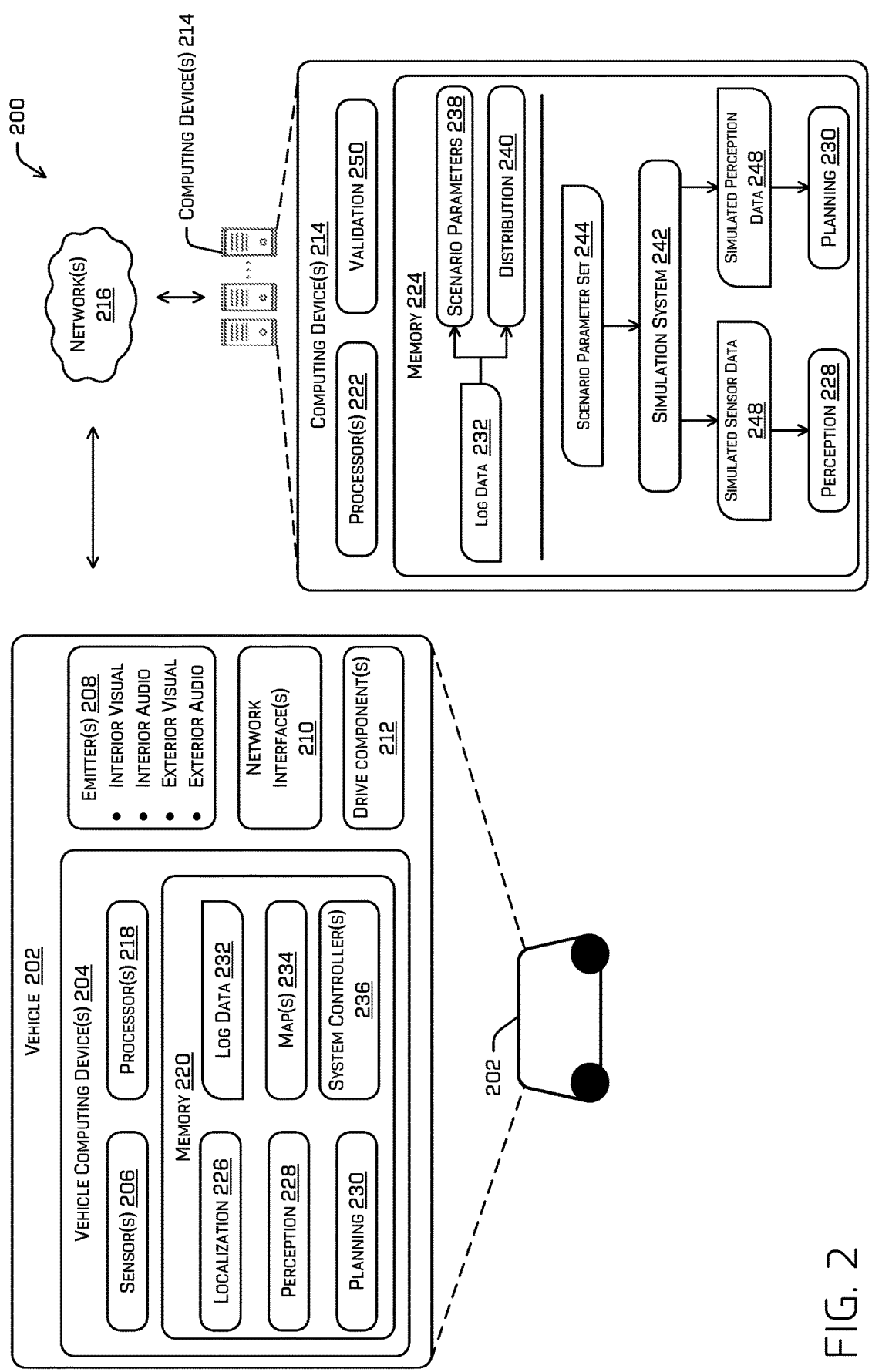
FIG. 2 illustrates a block diagram of an example architecture for generating simulations to validate and/or certify component(s) of an autonomous vehicle according to the techniques discussed herein.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 110 and sensor(s) 206 may represent sensor(s) 108. The system 200 may additionally or alternatively comprise computing device(s) 214, which may be a computing device remote from the vehicle 202.

In some instances, the sensor(s) 206 may represent sensor(s) 108 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. In some examples, the simulated sensors discussed herein may correspond to a specific type of sensor and/or any of the sensors. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 112. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, log data 232, map(s) 234, and/or system controller(s) 236—zero or more portions of any of which may be hardware, such as GPU(s), CPU(s), and/or other processing units. Perception component 228 may represent perception component 114 and planning component 230 may represent planning component 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle.

The log data 232 may comprise sensor data, perception data, and/or scenario labels collected/determined by the vehicle 202 (e.g., by the perception component 228), as well as any other message generated and or sent by the vehicle 202 during operation including, but not limited to, control messages, error messages, etc. In some examples, the vehicle 202 may transmit the log data 232 to the computing device(s) 214.

The computing device(s) 214 may determine scenario parameters 238 and/or distribution 240 based at least in part on the log data 232. For example, the computing device(s)

214 may identify different scenarios or bins of scenarios (e.g., scenarios that are closely related within a range of tolerances) in the log data. A scenario may comprise characteristics of the environment, object(s), and/or a simulation of the vehicle 202. For example, a scenario parameter may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk, "sidewalk"), and/or other kinematic qualities associated with the object and/or the object type (e.g., a friction coefficient, an elasticity, a malleability). As regards the environment itself, a scenario parameter may identify a topology of the environment, a layout of roadway(s) (e.g., four-way controlled intersection, three-way uncontrolled intersection, six-way atypical controlled intersection, two-lane highway, one-way direction of travel); weather conditions associated with the environment, a lighting state (e.g. sunny, cloudy, night), a location of light sources, a time of day, and/or the like. In some examples, topology, fixed object (e.g., buildings, trees, signage) locations and dimensions, and/or the like associated with the scenario parameter may be generated based at least in part on a portion of a map 234 that fits a roadway layout specified by a scenario parameter. In some examples, a set of scenario parameters may be used by the simulation system 242 to instantiate a three-dimensional representation of the object and/or the simulated environment. Additionally or alternatively, the three-dimensional representation may be based at least in part on map data (e.g., which may define a topology of the environment; the location and/or dimensions of fixtures such as signage, plants, and/or buildings) defined by a portion of a map 234 that corresponds with a layout specified by a scenario parameter. In some examples, scenario parameter(s) may additionally or alternatively identify characteristics associated with the autonomous vehicle (e.g., tire air low, sensor malfunction, relative position/velocity in environment or relative to object(s)); and/or a number, type, and/or configuration of objects in the scenario. The configuration may identify a position, orientation, trajectory/velocity, and/or state of the objects. A state may include additional data beyond movement data and may (or may not) affect movement of the object. For example, the state may indicate that an object is behaving erratically, in which case an erratic object model may be executed to control motion of the object in an erratic manner, such as to simulate an inebriated individual, a dog chasing traffic, or the like. However, in another example, the state may indicate that an object, such as a traffic light, is in a defined state, such as a "green light," or "missing light."

Regardless, these different characteristics, e.g., layout, object characteristics, etc., may be extracted and aggregated from log data received from one or more autonomous vehicles by the computing device(s) 214, resulting in a characterization of the different combinations of these characteristics as scenario parameters 238. In some examples, determining the scenario parameters may comprise generalizing at least some of the characteristics, such as, for example, binning roadway layouts based on the number of roadways and/or the curvature of the roadway, binning object types (e.g., grouping passenger trucks of different types into the single classification "passenger truck"), translating log data into a representation such as a number (e.g., instead of using the semantic label "four-way stop" represent that environment layout with a number or hash; instead of including the object type as a semantic label such as "passenger vehicle," represent that label as a number), and/or the like. The processing operation to generate a scenario parameter may comprise using sensor data and/or perception data to identify a relative (to the vehicle 202) location and/or type of an object. For example, the processing operation may identify a number and/or type of objects in the regions enumerated below and associating this data with the respective sensor data. The resulting metadata annotations may be clustered and a scenario label may be associated with each disparate cluster, which may be based on number and/or type of object and/or region. The regions may include, for example:

in front of the vehicle 202,
to a side of the vehicle 202,
behind the vehicle 202,
in a lane over from a lane of the vehicle 202,
in a next further lane from the vehicle 202,
in or near a variety of intersection/junction configurations (e.g., at a four-way controlled intersection; in a T-junction; at a 4-way, 2 controlled, 2 uncontrolled intersection), next to a roadway, etc.

In some examples, a scenario parameter may not be humanly comprehensible—the scenario label may merely be a cluster identifier—although in other examples, humanly comprehensible terms may be attached to the clusters (e.g., two objects to side of vehicle, one object in front of vehicle), trained embeddings, and the like.

Ultimately, a set of scenario parameters may define characteristics of a scenario sufficient to generate a simulation thereof. A single parameter of a set of scenario parameters may indicate a position of an object in the environment, another parameter of the set might may indicate a speed of the object, and so on so that characteristics of the autonomous vehicle, any object(s) in the environment, and/or the environment are defined. The different combinations of scenario parameters (i.e., sets of scenario parameters) may define a multi-dimensional space, i.e., a parameter space, where the different dimensions are associated with different ones of the scenario parameters.

The computing device(s) 214 may additionally or alternatively determine a distribution, such as a probability distribution function and/or Gaussian mixture model (GMM), associated with the scenario parameter space. In some examples, the distribution and/or scenario parameter sets may progressively be built as new log data and/or perception data associated with a scenario is added to the aggregation (or at one time over all the aggregated data). For example, the computing device(s) 214 may determine the distribution associated with the different sets of scenario parameters based at least in part on determining a probability associated with a particular set of scenario parameters. The simulation system may aggregate an occurrence rate or frequency with which a vehicle encounters a scenario corresponding to the set of scenario parameters. This occurrence rate may be aggregated from log data received from one or more vehicles.

The distribution may associate a probability with each of the sets of scenario parameters. In other words, the distribution may define a probability that a real-life scenario represented by a specific set of scenario parameters may occur, according to the previous log data. For example, the distribution may indicate how likely it is that the autonomous vehicle will approach a four-way stop at a certain speed, at a certain distance away from a particular object, etc. or how frequently the autonomous vehicle may encounter such a scenario.

The simulation system 242 may operate on the vehicle 202 and/or on the computing device(s) 214 (although FIG. 2 depicts the simulation system 242 as operating on the computing device(s) 214). If the simulation system 242 is operating on the vehicle, the simulation system 242 may provide alternate prediction(s) about the maneuver and/or path that an object may take. These alternate prediction(s) may be provided as input to the planning component 230. The simulation system 242 may run parallel to the perception component 228 and/or the perception component 228 may be part of the simulation system 242 and/or provide perception data to the simulation system 242.

The simulation system 242 may determine a simulation of the environment and/or the vehicle 202 based at least in part on selecting a scenario parameter set 244. For example, the simulation may comprise a representation of a position, orientation, movement, and/or quality of portions of the environment and/or the vehicle 202. The environment may comprise an object, such as another vehicle, a pedestrian, vegetation, a building, signage, and/or the like. Simulations can be used to validate software executed on the vehicle 202 and/or hardware and gather performance metrics (such as safety metrics) to ensure that the software is able to safely control such vehicles in various scenarios. In additional or alternative examples, simulations can be used to learn about the constraints of autonomous vehicles that use the autonomous controller. For example, simulation may be used to test operation of various components of the vehicle 202. In some examples, simulation may be used to test the perception component 228 and/or the planning component 230 of the autonomous vehicle based at least in part on providing data from the simulation to the perception component 228 and/or the planning component 230. These components are given as two examples, although it is understood that any other component of the vehicle 202 may be tested using the simulation, such as the localization component 226; component(s) of the drive component(s) 212, such as the brakes, wheels, tires; structural elements, such as the body, seats, etc.; and/or the like.

Simulations can be used to understand the operational space of an autonomous vehicle (e.g., an envelope in which the autonomous controller effectively controls the autonomous vehicle) in view of surface conditions, ambient noise, faulty components, etc. Simulations can also be useful for generating feedback for improving operations and designs of autonomous vehicles. For instance, in some examples, simulations can be useful for determining an amount of redundancy that is required in an autonomous controller, how to modify a behavior of the autonomous controller based on what is learned through simulations, or whether the autonomous controller is ready to be deployed.

The simulation system 242 may select a set of scenario parameters 244 according to the techniques discussed herein, e.g., selected based at least in part on the distribution or the modified distribution. The simulation system 242 may use the set of scenario parameters 244 to generate the simulation, which may be a two or three-dimensional representation of the scenario. For example, the three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out.

In some examples, a simulated sensor may determine simulated sensor data 246 based at least in part on the simulation generated by the simulation system 242. For example, U.S. patent application Ser. No. 16/581,632, filed Sep. 24, 2019 and incorporated herein for all purposes, discusses this in more detail. In an additional or alternate example, the simulation may itself comprise simulated sensor data and/or simulated perception data 248.

In an example where the perception component 228 and/or planning component 230 is/are being tested, the perception component 228 (e.g., a copy thereof, which may comprise software and/or hardware, which may include hardware-in-the-loop simulation) may receive the simulated sensor data 246 generated based on the simulation and may output prediction data, which may comprise a predicted maneuver and/or a predicted path of a simulated object. The perception component 228 may provide the prediction data to the planning component 230 (e.g., a copy thereof, which may comprise software and/or hardware, which may include hardware-in-the-loop simulation). Additionally or alternatively planning component 230 may receive simulated perception data 248 from the simulation system 242.

The planning component 230 may generate a trajectory for controlling vehicle 202, which may be used by the simulation system 242 to control a simulation of the vehicle 202 in addition to or instead of sending instructions to the drive component(s) 212 to implement the trajectory.

In some examples, the simulation system 242 may additionally or alternatively determine one or more metrics based at least in part on the results of a simulation. The results may include data such as the minimum distance from the simulated representation of the vehicle 202 to any simulated object over the course of the simulation, a velocity of the autonomous vehicle over the course of the simulation, etc. In some examples, the simulation system 242 may store a ruleset and may determine whether the planning component 230 (or any other component of the vehicle 202) passed or failed a scenario based at least in part on the ruleset. In some examples, the simulation system 242 may record a version of the planning component 230 in association with a scenario identifier and/or an indication of whether the planning component 230 passed or failed. In an additional or alternate example, the simulation system 242 may determine a non-binary indication associated with performance of the planning component 230 (e.g., a score in addition to or instead of a pass/fail indication). The non-binary indication may be based at least in part on a set of weights associated with the ruleset. In at least one example, the ruleset may specify a maximum number of impacts per n iterations of a scenario, where n is a positive integer. In some examples, the ruleset may be part of or replaced by an event detection system (U.S. patent application Ser. No. 16/682,971, filed Nov. 13, 2019, the entirety of which is incorporated herein for all purposes) and/or a collision monitoring system (U.S. patent application Ser. No. 16/703,625, filed Dec. 4, 2019, the entirety of which is incorporated herein for all purposes).

Regardless, any of the results, events, rulesets, etc. discussed above may be used to determine the one or more metrics associated with a component of the vehicle or the vehicle 202 overall performance. In some examples, the simulation system 242 may additionally or alternatively determine a confidence score (e.g., a confidence interval) associated with a metric. In at least one example, one of the metrics may be a number of impacts or disengagements per thousand miles, a probability of disengagement or impact, or the like.

The memory 220 and/or 224 may additionally or alternatively store a mapping system, a planning system, a ride management system, validation component 250, etc. Although perception component 228 and/or planning component 230 are illustrated as being stored in memory 220 and/or 224, perception component 228 and/or planning component 230 may include processor-executable instructions, machine-learned model(s) (e.g., a neural network), and/or hardware.

In some examples, the validation component 250 may determine whether to authorize a modification to the vehicle 202. Based at least in part on determining that the metric(s), as described herein, satisfy a threshold, the validation component 250 may comprise instructions to the vehicle 202 to cause the modification to be made (e.g., by transmitting an update to a component, by providing a notification that a hardware change can be made). In some examples, satisfaction of the threshold will depend on the type of metric—for a metric that indicates a likelihood that an adverse event will occur, satisfaction may include determining that the likelihood is less than a threshold likelihood. To give another example, for a metric indicating a reliability or efficacy of a component, satisfaction may include meeting or exceeding a threshold. In some examples, the validation component may determine the metric(s) discussed herein based at least in part on simulation results. For example, the validation component may determine an occurrence rate of adverse event(s), a number of scenarios simulated before an adverse event occurred in a simulation, and/or apply the correction factor to the metric.

As described herein, the localization component 226, the perception component 228, the planning component 230, the simulation system 242, and/or other components of the system 200 may comprise one or more ML models. For example, the localization component 226, the perception component 228, the planning component 230, and/or the simulation system 242 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228 and/or simulated perception data and transmit the instructions to the system controller(s) 236, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process for Instantiating a Simulation

Figure 3:
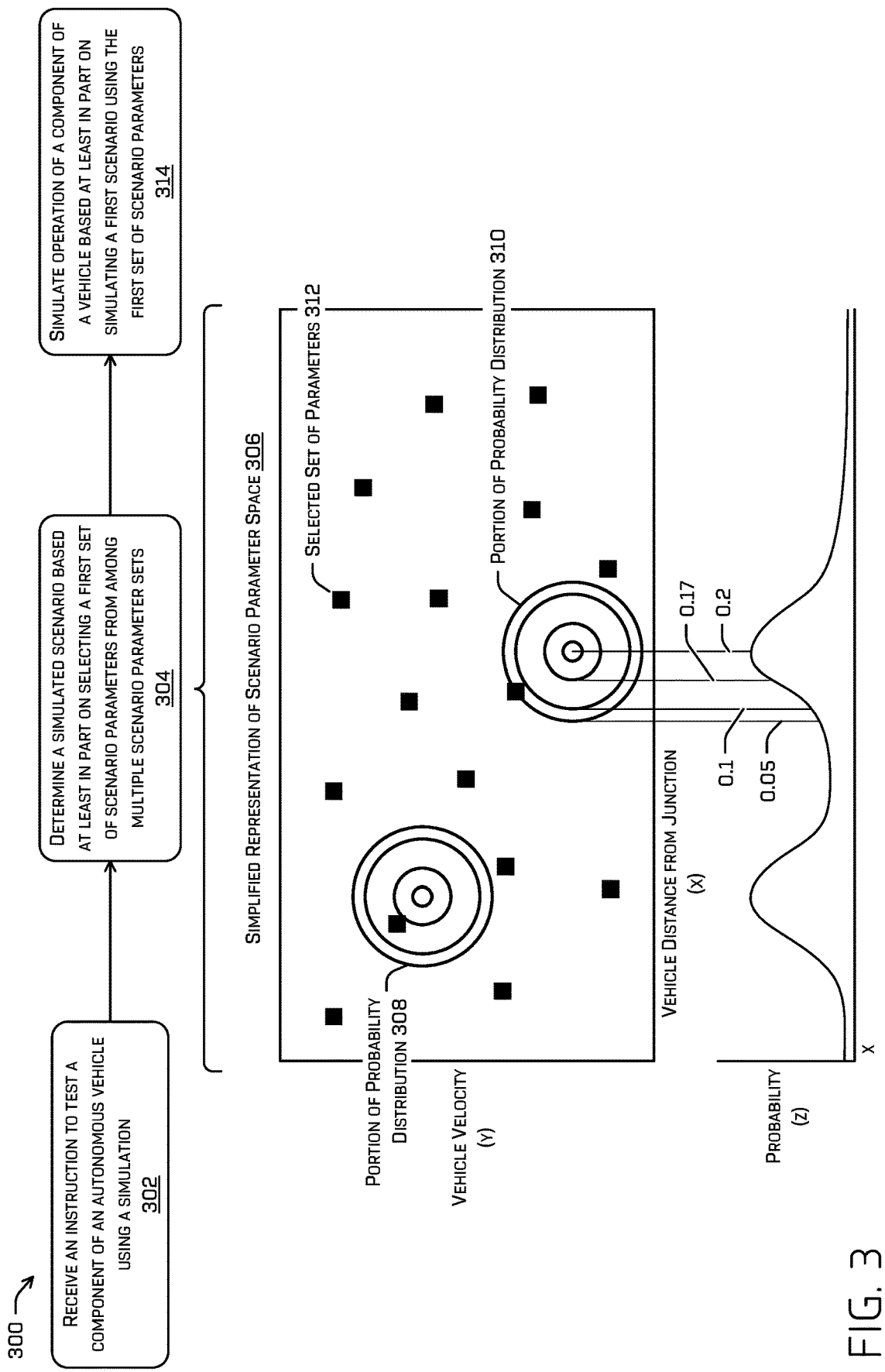
FIG. 3 illustrates a flow diagram of an example process for instantiating a simulation by selecting scenario parameters based at least in part on a probability distribution.

FIG. 3 illustrates a pictorial flow diagram of an example process 300 for instantiating a simulation by selecting a set of scenario parameters based at least in part on a probability distribution. In some examples, example process 300 may occur at computing device(s) 214. In an additional or alternate example, example process 300 may occur at vehicle 202. In some examples, example process 300 may be executed by the simulation system 242 in a fully or partially synthetic scenario, where the scenario is fully generated based at least in part on scenario instructions or partially using sensor data, respectively. The synthetic scenario may be executed in real or synthetic time. For example, a partially synthetic scenario may generate the scenario data based at least in part on real-time sensor data or based on log data.

At operation 302, example process 300 may comprise receiving an instruction to test and/or validate a component of an autonomous vehicle using a simulation, according to any of the techniques discussed herein. In some examples, the instructions may include or be accompanied with a probability distribution (a "distribution") associated with a scenario parameter space.

At operation 304, example process 300 may comprise determining a simulated scenario based at least in part on selecting a first set of scenario parameters from among multiple scenario parameter sets, according to any of the techniques discussed herein. FIG. 3 depicts a simplified representation of the scenario parameter space at 306. In practice, the scenario parameter space may be a high dimensional space. Instead of attempting to represent 5, 10, 50, 100, or more dimensions, FIG. 3 illustrates a small portion of the parameter space and the distribution. The simplified representation 306 indicates scenario parameter sets as filled-in squares. Note that the locations of the sets of scenario parameters illustrated in FIG. 3 are for example only and do not reflect the corresponding locations of the local maxima of the distribution(s) (e.g., component(s) of a Gaussian mixture model (GMM)). In at least one example, the density of sets of scenario parameters may increase closer to a local maximum of a distribution, although this may not always be the case. In this simplified example, each set only includes two parameters: vehicle velocity (i.e., the velocity of the vehicle 202 or simulation thereof at the beginning of the scenario/simulation) and vehicle distance from a roadway junction (i.e., vehicle 202 or a simulation thereof distance from the junction at the beginning of the scenario/simulation). Vehicle velocity is represented on a y-axis of the simplified representation and vehicle distance from a junction is represented on the x-axis.

The distribution (e.g., a probability distribution function, Gaussian mixture model (GMM)) is represented by contours in the x-y coordinate graph and on the z-axis in the x-z coordinate graph. The contours are represented as concentric circles and, in the illustrated example, the distribution is bimodal in the simplified dimensions and therefore has two local maxima and two sets of concentric circles—i.e., portion of probability distribution 308 and portion of probability distribution 310. Note that the distribution may not be as uniform as the illustrated distribution and may be multimodal (e.g., two, three, four, tens, hundreds of modes, depending on the number of dimensions and the distribution characteristics).

Put simply, the closer a set of parameters, represented as a filled-in square, is to the center of one of the smallest circles (a local maximum probability indicated by the distribution), the more likely a scenario associated with that set of parameters is to occur in the real-world (and, correspondingly, the more likely the scenario would be selected for simulation). Instead of randomly selecting a set of parameters for generating a simulation, to accurately test real-world performance of the vehicle or a component thereof, the set of parameters may be selected based at least in part on the distribution. For example, the selection may still be random, but the algorithm used to randomly select parameters may be weighted according to the distribution.

FIG. 3 depicts a selected set of parameters 312 that may be selected based at least in part on sampling the distribution. The selected set of parameter 312, in this simplified example, indicates a vehicle velocity and vehicle distance from a junction for the simulation.

At operation 314, example process 300 may comprise simulating operation of a component of the vehicle based at least in part on simulating a first scenario using the first set of scenario parameters, according to any of the techniques discussed herein. In other words, the selected set of parameters 312 may be used to instantiate a simulation of a first scenario. The way the simulation is run (e.g., whether simulated sensor data and/or simulated perception data is generated and which components such data is provided to) and the results of the simulation may be used to determine metric(s) associated with the vehicle and/or the component.

Example Process for Executing a Simulation Using Scenario Parameters

Figure 4:
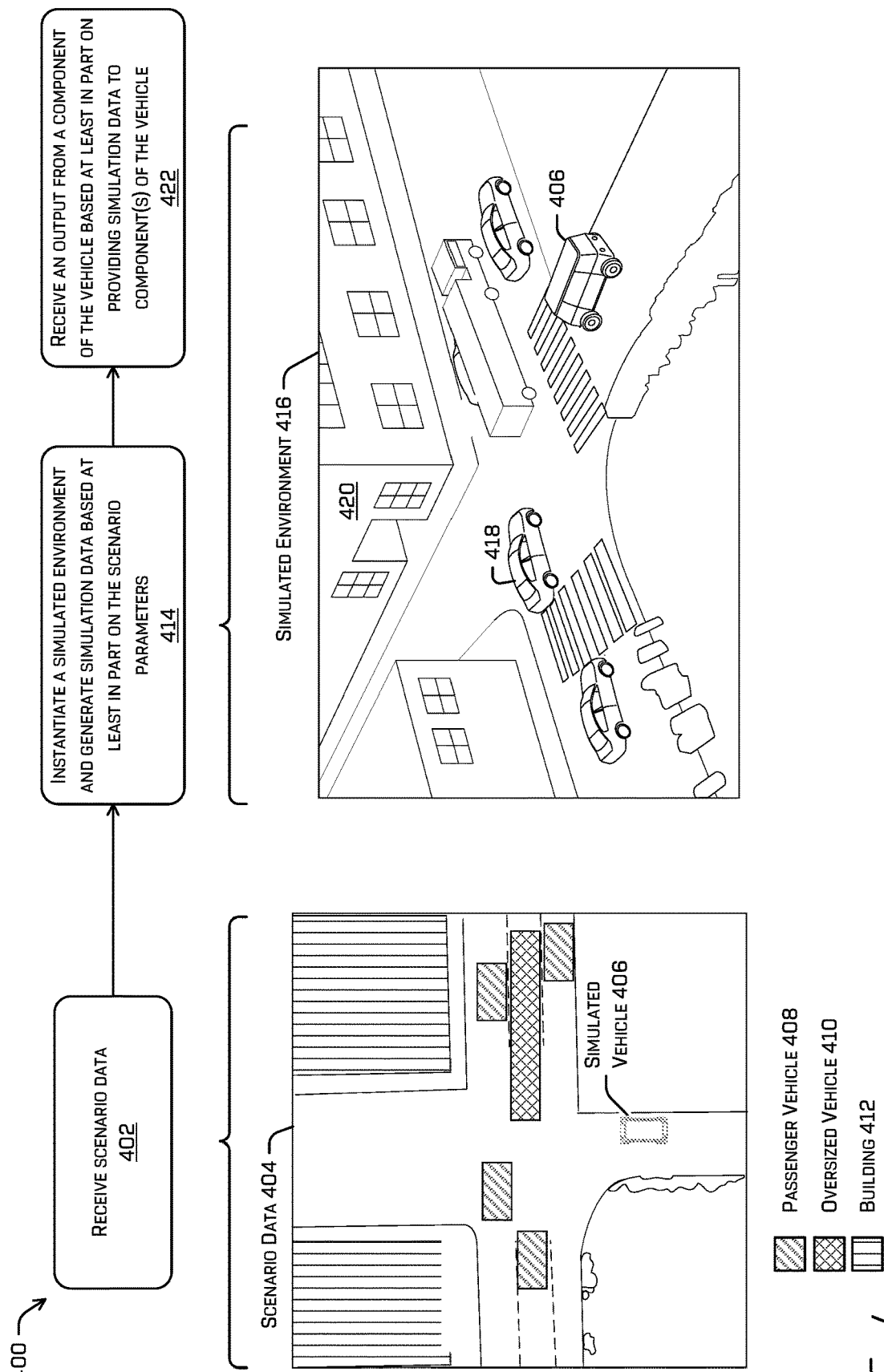
FIG. 4 illustrates a flow diagram of an example process for using scenario parameters to generate a scenario and testing operation of a component of an autonomous vehicle to accurately determine a likelihood that operation of the component will result in an adverse event.

FIG. 4 illustrates a pictorial flow diagram of an example process 300 of an example process for using scenario parameters to generate a scenario and testing operation of a component of an autonomous vehicle to accurately determine a likelihood that operation of the component will result in an adverse event. In some examples, example process 400 may be executed by the simulation system 242 in a fully or partially synthetic scenario, where the scenario is fully generated based at least in part on scenario instructions or partially using sensor data, respectively. The synthetic scenario may be executed in real or synthetic time. For example, a partially synthetic scenario may generate the scenario data based at least in part on real-time sensor data or based on log data.

At operation 402, example process 400 may comprise receiving scenario data, according to any of the techniques discussed herein. The scenario data 404 may comprise the set of scenario parameters selected according to the techniques discussed herein. In an additional or alternate example, a simple simulation component may generate the scenario data 404 based at least in part on the set of scenario parameters. In some examples, the simple simulation component may determine a portion of a map that fits minimum requirements specified by the set of scenario parameters, such as a number of controlled intersections, a number of roadways, the existence and/or placement of roadway or field of view obstructions, etc. In some examples, the scenario data 404 may comprise a position, orientation, and/or characteristics of the simulated vehicle 406 in the environment, which may correspond to real-time operation of an autonomous vehicle and/or may correspond to simulated operation of the autonomous vehicle. In some examples, a planning component of the autonomous vehicle may generate instructions for controlling the simulated vehicle 406 in an agnostic manner to the simulation (e.g., the instructions generated by the planning component may be the same as those generated for a similar real-world situation). In some examples, a component may translate instructions generated by the planning component to instructions for controlling the simulated vehicle 406 in the simulated environment (e.g., updating a simulated state associated with the simulated vehicle 406, which may comprise a position, orientation, velocity, acceleration, heading, and/or the like associated with the simulated vehicle 406).

The scenario data 404 may additionally or alternatively comprise an indication of an object type associated with one or more objects (e.g., passenger vehicle 408, oversized vehicle 410, building 412) and/or characteristics associated with the one or more objects (e.g., a position, velocity, acceleration, heading, material type, kinematic coefficient), as indicated by the selected set of scenario parameters. Note that the scenario data 404 is represented as a two-dimensional image, although, in additional or alternate examples, the scenario data 404 may comprise a data structure, such as a pub-sub message, and/or the like.

At operation 414, example process 400 may comprise instantiating, based at least in part on the scenario data, a simulated environment, according to any of the techniques discussed herein. Operation 414 may comprise procedurally generating the simulated environment 416 based at least in part on a set of template models associated with the object types. For example, the set of template models may comprise six different passenger vehicle models, eighteen different pedestrian models, two different types building models, and/or the like. Any number of different models may exist. In some examples, a template model may comprise a three-dimensional model of a surface of an object without any texturing, although in additional or alternate examples, the model may comprise texture. The template model may comprise a polygon mesh, a triangle mesh, and/or the like. In some examples, models associated with dynamic objects may have a higher polygon count than models associated with static objects. For example, vehicle 418 may comprise a polygon mesh having a first polygon count and building 420 may comprise a polygon mesh having a second polygon count, where the first polygon count is greater than the second polygon count.

In some examples, the simulated environment 416 may comprise surface models and lack lighting and/or textures. In additional or alternate examples, the simulated environment 416 may comprise lighting and/or textures, but the techniques described herein work without lighting and/or textures. The simulated environment 416 may comprise a model of the simulated vehicle 406. In some examples, instantiating the environment portion of the simulated environment may be based at least in part on map data and objects in the environment may be based at least in part on instructions received as part of the scenario data (e.g., instructions generated based at least in part on user selection(s) and/or interaction with a user interface, procedurally-generated instructions).

At operation 422, example process 400 may comprise receiving an output from a component of the vehicle based at least in part on providing simulation data to component(s) of the vehicle, according to any of the techniques discussed herein. The simulation data may comprise providing a portion of the simulated environment 416 to a simulated sensor, simulated sensor data to a perception component, simulated perception data to a planning component, and/or the like. Output(s) of the component may be used to control the simulated vehicle 406 in the simulation and/or may be tracked in the simulation results for use in determining a metric and/or confidence interval associated with the component.

Figure 5:
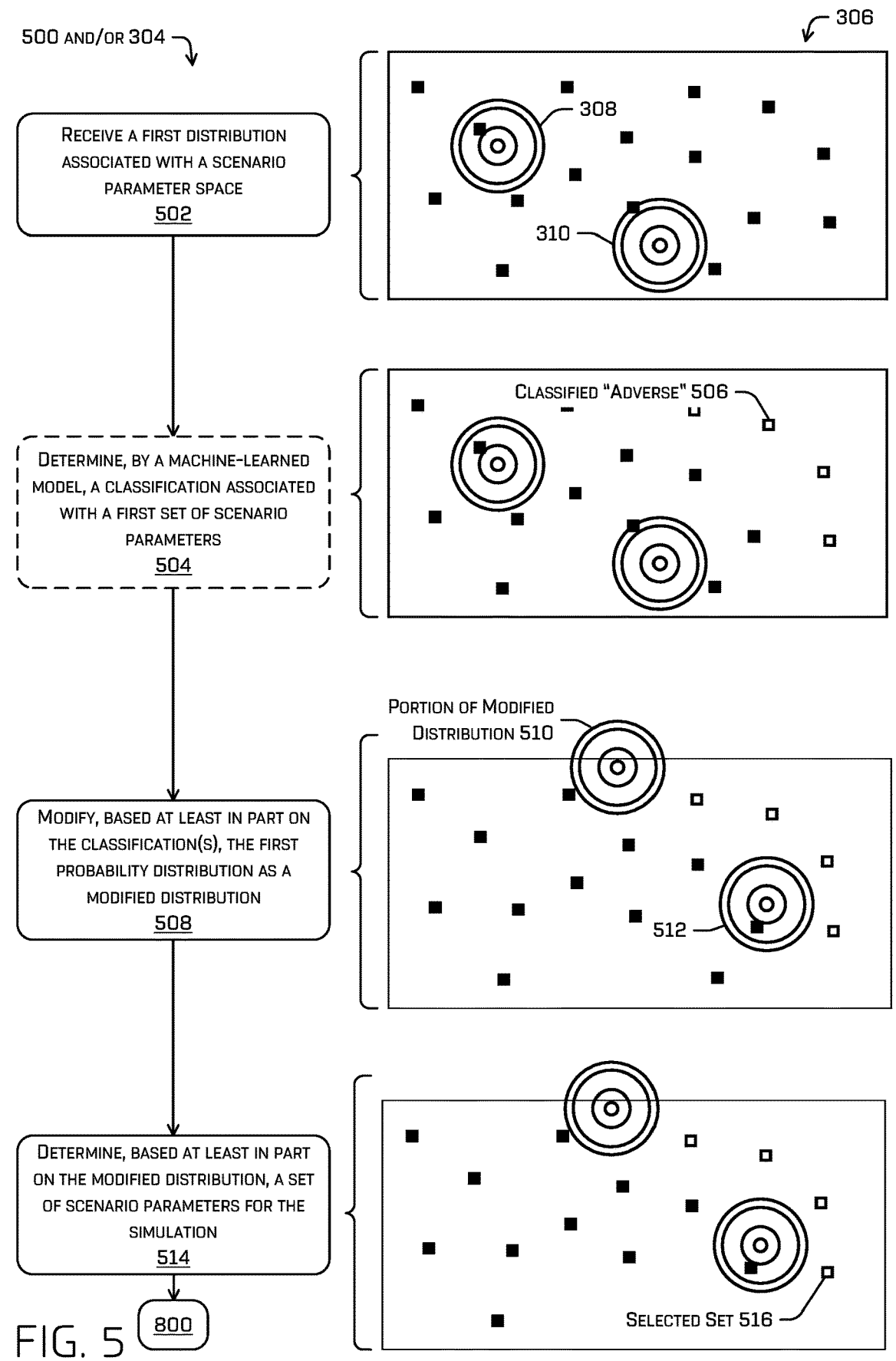
FIG. 5 illustrates a flow diagram of an example process for increasing the probability of selecting a set of scenario parameters that is more likely to cause the simulation to result in an adverse event.

FIG. 5 illustrates a flow diagram of an example process 500 for increasing the probability of selecting a set of scenario parameters that is more likely to cause the simulation to result in an adverse event. In some examples, example process 500 may be at least a part of operation 304—determining a scenario to simulated based at least in part on selecting a set of scenario parameters from among the multiple scenario parameter sets in the parameter space.

At operation 502, example process 500 may comprise receiving a first distribution associated with a scenario parameter space, according to any of the techniques discussed herein. The depicted representation of the parameter space is the same simplified representation 306 illustrated in FIG. 3 with the axis labels removed for the sake of the simplicity of presentation. To reiterate, different sets of the scenario parameters (of the two-dimensional simplified example) are represented as filled-in squares and the local maxima of a bimodal distribution are represented as concentric circles. For example the portion of the distribution 310 depicted as four concentric circles depicts increasing probability of the occurrence of sets of scenario parameters nearest to the smallest circle of the four concentric circles.

At operation 504, example process 500 may comprise determining, by a machine-learned (ML) model, a classification associated with a first set of scenario parameters, according to any of the techniques discussed herein. Operation 504 is represented using a dashed line because, in some examples, it may be excluded or may be different. For example, the ML model may be trained to classify a set of parameters as resulting an adverse event or not. In an additional or alternate example, a set of parameters may be indicated as being associated with an adverse event based at least in part on the real-world scenario or simulated scenario resulting in the autonomous vehicle impacting an object, coming within a minimum distance of an object (e.g., the minimum distance from the vehicle to an object at any point during the scenario is equal to or less than a minimum distance threshold), a time to impact was equal to or less than a time to collision threshold, and/or a deceleration required to avoid an impact met or exceeded a threshold, any of which may constitute an adverse event. Additional or alternate surrogate metrics for detecting an adverse event are discussed in U.S. patent application Ser. No. 16/953,277, filed Nov. 19, 2002, the entirety of which is incorporated herein for all purposes. Sets of scenario parameters classified or identified as being associated with an adverse event, such as set 506, are indicated in FIG. 5 as unfilled squares. Regardless of whether an ML model is used to determine a likelihood that a set of scenario parameters is associated with an adverse event or a real-world scenario or a simulation is used to determine that a set of scenario parameters is associated with an adverse event, operation 504 results in the first set of scenario parameters being classified as being associated with an adverse event or being a non-adverse event.

In some examples, operation 504 may additionally or alternatively comprise determining whether a scenario (and the associated set of scenario parameters) is invalid and excluding the scenario and the associated set of scenario parameters from the parameter space. Determining that a scenario is invalid may comprise determining that an adverse event occurred before a component of the autonomous vehicle initialized or within a time period after the component initialized, or receiving an error code based at least in part on simulating the scenario (e.g., the logic is unworkable—e.g., two vehicles occupy the same space and fuse together).

At operation 508, example process 500 may comprise modifying, based at least in part on the classification(s), the first probability distribution as a modified distribution, according to any of the techniques discussed herein. Operation 508 is discussed in more detail in the discussion associated with FIG. 6 and FIG. 7. In some examples, operation 508 may modify the distribution to increase a likelihood that a set of scenario parameters is selected for a simulation (e.g., at operation 304) that results in an adverse event in the scenario, such as the simulated vehicle being at or less than a minimum distance threshold from a simulated object at any point during the simulation, a time to impact being less than a threshold time period at any point in the simulation, a deceleration required to avoid impact being equal to or greater than a threshold deceleration, and/or the like. FIG. 5 depicts portions of the modified distribution 510 and 512—note that the local maxima have moved closer to the scenario parameter sets classified as being associated with adverse events.

At operation 514, example process 500 may comprise determining, based at least in part on the modified distribution a set of scenario parameters for the simulation, according to any of the techniques discussed herein. For example, operation 514 may comprise (randomly) sampling the modified distribution, which may result in the selected set 516 depicted in FIG. 5. In an example where, at operation 504, the set of scenario parameters is classified as being associated with an adverse event using a binary method, e.g., due to labelling from a previous simulation or a real-world scenario, then operation 514 does not result in simulating the simulation parameters. Whereas, if the classification occurred by an ML model and/or if the set of scenario parameters determined at operation 514 haven't been simulated yet, operation 514 may result in simulating a scenario based at least in part on the set of scenario parameters.

In some examples, example process 500 may continue to iteratively execute operation 508 and 514 until a simulation run using the set of scenario parameters generated at operation 514 results in an adverse event. In some examples, operation 508 may execute once and 514 may be iterated until an adverse event occurs or operation 508 may execute every n number of executions of operation 514, where n is a positive integer. Once an adverse event occurs in a simulation, example process 500 may continue to operation 800.

Figure 6:
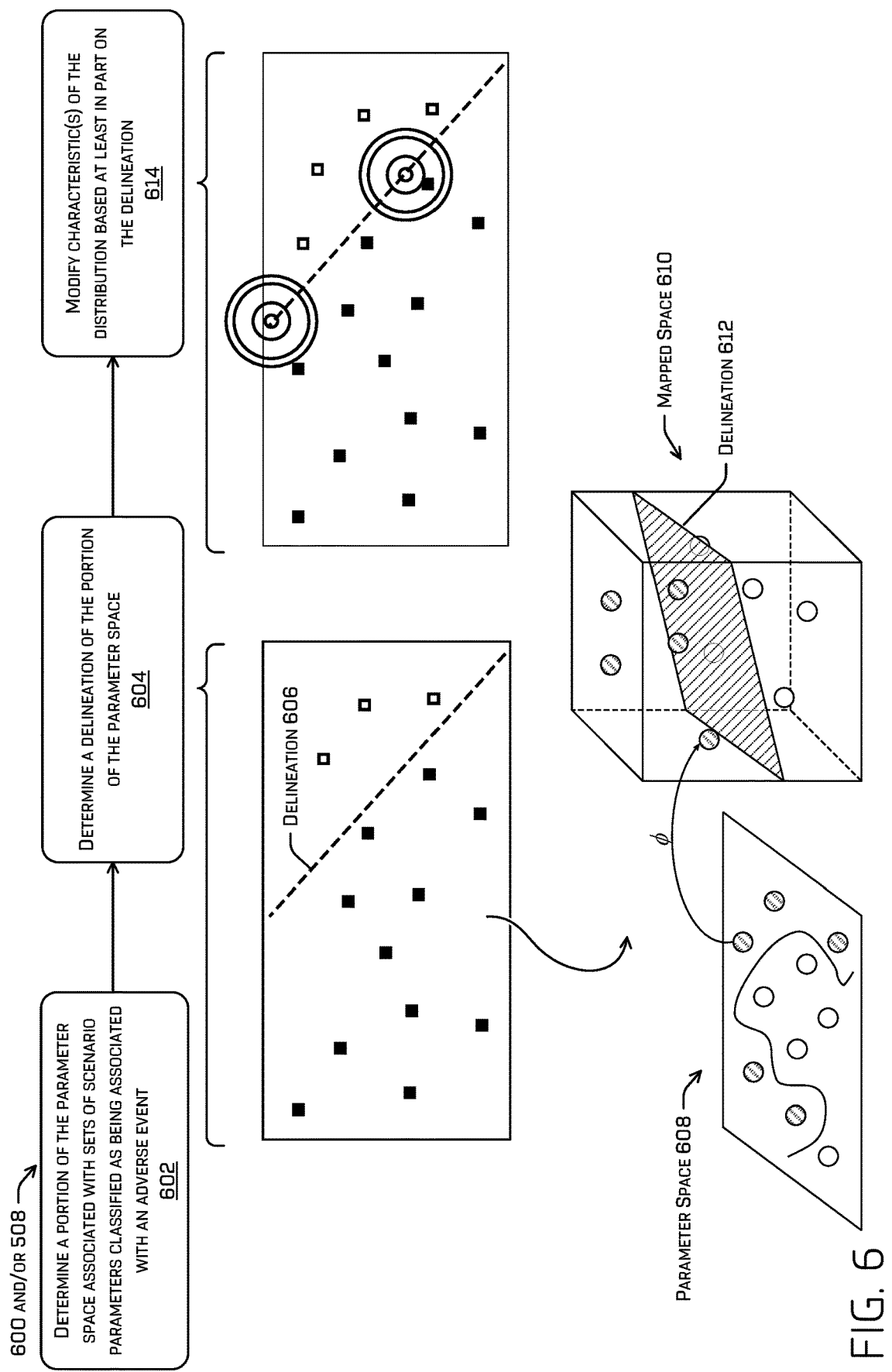
FIG. 6 illustrates a flow diagram of an example process for modifying a distribution associated with scenario parameter sets to increase the probability of a simulation that results in an adverse event.

Example Process for Modifying a Distribution to Increase a Likelihood of a Simulation Resulting in an Adverse Event FIG. 6 illustrates a flow diagram of an example process 600 for modifying a distribution associated with scenario parameter sets to increase the probability of a simulation that results in an adverse event. In some examples, example process 600 may be at least part of operation 508. Example process 600 may include modifying the way a set of scenario parameters is selected from among multiple possible scenario parameters. Example process 600 may comprise modifying the distribution to increase a probability that the simulation system will select a set of scenario parameters that will result in the occurrence of an adverse event in a simulation generated from the selected set of scenario parameters. However, by modifying this distribution, the metric(s) determined for a component that's being tested would be skewed to show that the component is less safe or efficacious. The techniques may further comprise determining a correction factor to account for the modification of the distribution. A validation system may determined metric(s) associated with the vehicle and/or a component thereof based at least in part on the correction factor and results of the simulations. By increasing the number of adverse events or by simulating at least one scenario that results in an adverse event, the confidence interval determined by the validation system may be increased and the correction factor may ensure that the metric(s) determined by the validation system are accurate even though the distribution was modified according to the techniques discussed herein.

At operation 602, example process 600 may comprise determining a portion of the parameter space associated with sets of scenario parameters classified as being associated with an adverse event, according to any of the techniques discussed herein. Operation 602 may comprise determining a cluster and/or a region of the parameter space associated with a density of adverse sets that meets or exceeds a threshold.

At operation 604, example process 600 may comprise determining a delineation of the portion of the parameter space, according to any of the techniques discussed herein. In some examples, the algorithm for determining the delineation may be the same or different as the algorithm for determining the portion of the parameter space at operation 602. In at least one example, operation(s) 602 and/or 604 may comprise using a support vector machine (SVM) classifier to determine a convex set comprising the sets (or more than a threshold percentage of the sets, e.g., 80%, 90%, 95%, 99%, any other number) of scenario parameters resulting in an adverse event. A convex set can be a set wherein, given any two points in the set, the set contains the whole line segment that joins the two points (i.e., the line segment does not traverse an area outside of the set). In certain examples, the SVM classifier may receive a pre-processed version of the parameter space, wherein pre-processing the parameter space may include an explicit polynomial transformation of data. The SVM classifier can be a linear classifier on explicitly modeled polynomial space. In some examples, the delineation may be a surface or hyperplane separating the "adverse" sets from the normative sets, such as may be defined by a parametric equation. FIG. 6 depicts a simplistic linear delineation 606 to generally illustrate the concept, even though the delineation may not be linear. However, in some examples, the separation may not be linear and/or there may be multiple convex sets. In such an example, feature expansion may be used to expand the parameter space, in which case a linear hyperplane may be applied to the mapped space and/or multiple delineations may be made. For example, FIG. 6 also depicts a feature expansion ϕ, to project the parameter space 608 into a mapped space 610 having a greater number of dimensions than the parameter space. FIG. 6 also depicts a hyperplane delineation 612 in the mapped space.

At operation 614, example process 600 may comprise modifying one or more characteristics of the distribution based at least in part on the delineation, according to any of the techniques discussed herein. Operation 614 may comprise moving a mean of the distribution to a nearest portion of the delineation. In an example where the delineation is a GMM, operation 614 may comprise moving a center of a component of the GMM to a nearest portion of the delineation, moving up to all of the components of the GMM. In an additional or alternate example, modifying the GMM may comprise modifying the normalization and/or shape of a component of the GMM based at least in part on the delineation. The modification can be minimized, meaning moving a center or a mean to the delineation may comprise moving the center or mean to a closest portion of the delineation. The minimization of the modification can also include moving the mean of a GMM component without modifying the shape (e.g., the corresponding variance matrix).

In some examples, minimizing the modification may comprise feature expansion of the parametric space. For a polynomial expansion of degree 2 this may comprise transforming a 2-dimensional parameter space to a 5-dimensional space or a 7-dimensional parameter space to a 35-dimensional space. In an example where the distribution is a GMM, the distribution may also need to be expanded—a 2-dimensional GMM of components expanded by a degree of 2 would result in a 5-dimensional GMM or a 7-dimensional GMM expanded by a degree of 2 would result in a 35-dimensional GMM. The feature expansion may allow a smaller modification to be made to the distribution than if expansion was accomplished, e.g., via a minimization of the modification over the increased number of parameters. The exponential increase of parameters in the optimization problem may be dealt with by adding additional constraints to the minimization problem to return the number of parameters to be closer to the number of features.

In an example where feature expansion is employed, the resultant polynomial GMM may be converted back to a base (feature) GMM by integrating over all the polynomial features to determine the marginal distribution of the base features (e.g., in the original parameter space). This may result in a modified GMM defined over the original parameter space, i.e., the base GMM. In some examples, the following property of Gaussian multivariate distributions may be used to recover the base GMM.

Figure 7A:
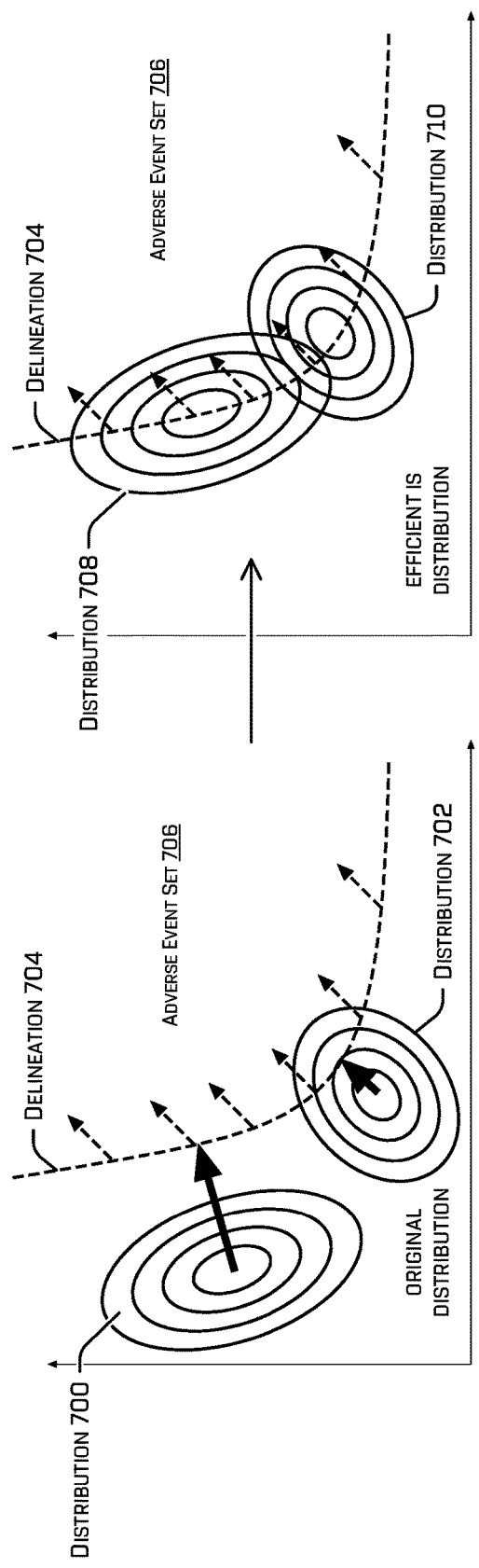
FIGS. 7A and 7B illustrate various methods for modifying a distribution based at least in part on a delineation.
Figure 7B:
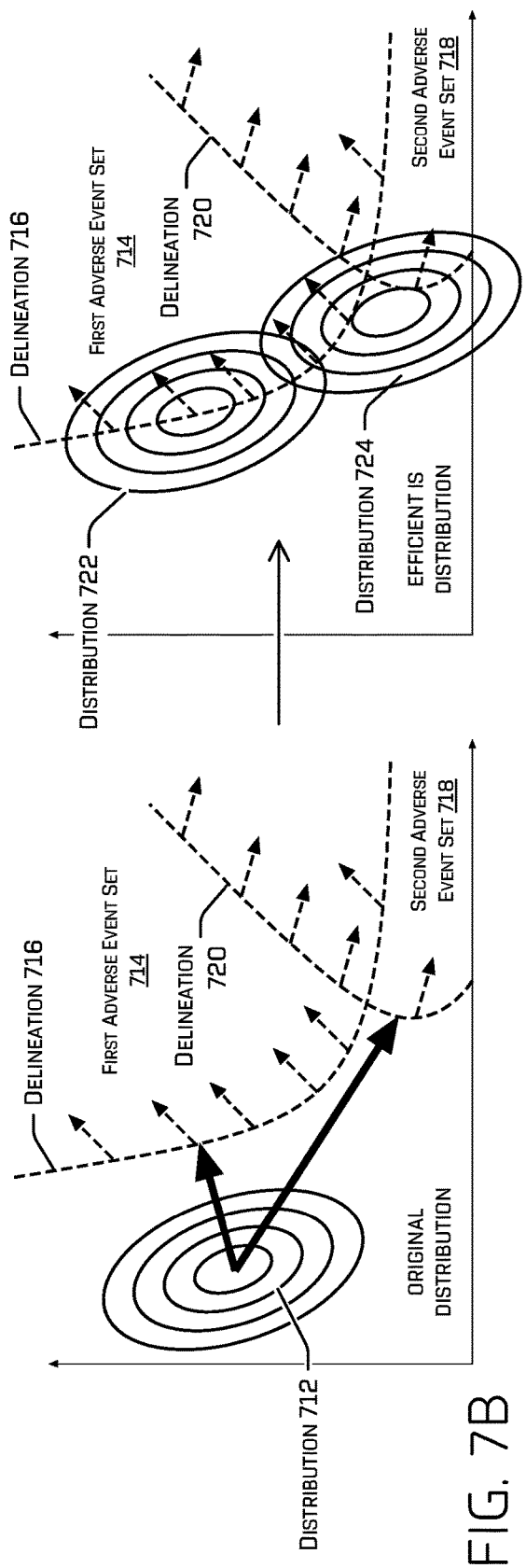

FIGS. 7A and 7B illustrate various methods for modifying a distribution based at least in part on a delineation. FIG. 7A depict two local maxima of a distribution or, in another example, two distributions of a GMM—distribution 700 and distribution 702, which may be two of multiple distributions associated with the GMM in a non-limiting example. A delineation 704 has already been determined in association with an adverse event set 708 in the depicted example. The dashed arrows emanating from the delineation 706 in the illustration indicate a direction in which the adverse event set 708 lies relative to the delineation 704. The techniques discussed herein include determining a minimum modification to characteristic(s) of the distribution 700 and characteristic(s) of the distribution 702 to associate the distribution 700 and the distribution 702 with the delineation 704. This minimum modification is depicted in FIGS. 7A and 7B as large bolded arrows, which are unlabeled for the sake of clarity. The resulting modified distributions 708 and 710 have means that are associated with the delineation 706. Although the depicted example shows a modification where the respective means of the distribution are moved to be associated with the closest portion of the delineation 704, it is understood that a characteristic of the distribution may be otherwise associated with the delineation, such as associating a mean with anywhere in a band of the delineation where the band may be defined as a distance from the delineation determined based at least in part on a density of scenario parameters near the delineation, a number of sets of parameters classified as being associated with an adverse event, and/or as a static value. In an additional or alternate example, the distribution may remain unmodified if the distribution is within the band or already otherwise associated with the delineation.

FIG. 7B illustrates modification of a single distribution 714 when determining the adverse sets results in identifying multiple adverse sets and respective delineations for each adverse set, depicted in FIG. 7B as a first adverse event set 714 and delineation 716 associated therewith and a second adverse event set 718 and delineation 720 associated therewith. In such an instance, multiple modified distributions may be determine, e.g., a first modified distribution 722 associated with delineation 716 and a second modified distribution 724 associated with delineation 720. In at least one example, the first modified distribution 722 and the second modified distribution 724 may be new distributions of a GMM that replace distribution 712 and the weight associated therewith. The first modified distribution 722 and the second modified distribution 724 may each have a weight associate therewith that is based at least in part on the weight of the distribution 712. In some examples, such weights may be based at least in part on the extent of the modification to associate the distribution 722 with delineation 716 and the distribution 724 with the delineation 720 or, in an other example, the weights may merely be half that of the weight associated with distribution 712.

Figure 8:
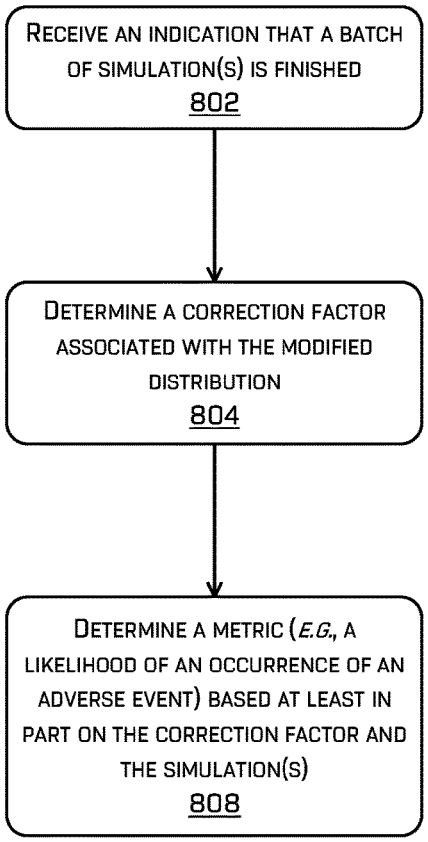
FIG. 8 illustrates a flow diagram of an example process for determining an accurate performance metric associated with the vehicle and/or a component thereof based at least in part on determining a correction to account for the modified distribution.
Figure 8:
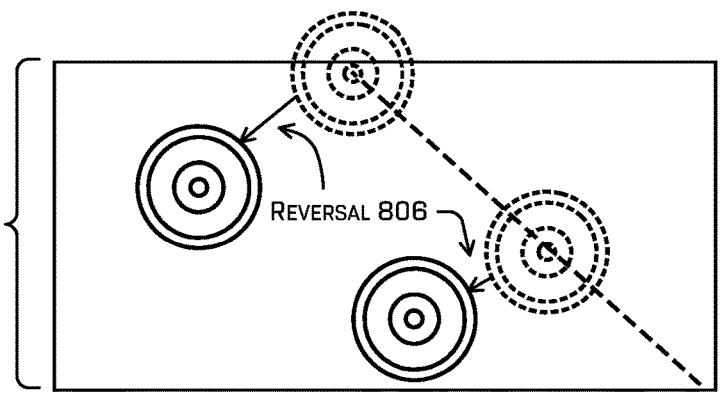

Example Process for Modifying a Distribution to Increase a Likelihood of a Simulation Resulting in an Adverse Event FIG. 8 illustrates a flow diagram of an example process 800 for determining an accurate performance metric associated with the vehicle and/or a component thereof based at least in part on determining a correction factor to account for the modified distribution. For example, example process 800 may comprise determining an accurate likelihood of an adverse event occurring based at least in part on determining a correction to account for the modified distribution. Determining a metric may be based at least in part on simulation results and example process 800 may additionally or alternatively comprise determining a confidence associated with the metric. In some examples, example process 800 may be based at least in part on operation 508. In some examples, example process 800 may be accomplished by the simulation system 242 and/or the validation component 250.

At operation 802, example process 800 may comprise receiving an indication that a batch of simulation(s) is finished, according to any of the techniques discussed herein. Operation 802 may comprise determining that an adverse event has occurred in a simulation based at least in part on the results of the simulation. In at least one example, the batch of simulations may finish once the first adverse event has been detected. Detecting the adverse event may comprise using the simulation results to determine whether there was any point in the simulation at which a surrogate metric satisfied a threshold (e.g., deceleration to avoid impact met or exceeded a deceleration threshold, a time to impact was less than a threshold time). In an additional or alternate example, the batch may be finished at a pre-defined number of simulations or a predefined number of adverse events.

At operation 804, example process 800 may determining a correction factor associated with the modified distribution, according to any of the techniques discussed herein. The correction factor may be a density ratio, weight, or likelihood-ratio for modifying a performance metric to account for the bias introduced by modifying the distribution. Given the probability distribution, f(x), a metric indicating a likelihood of impact, such as the probability of impact or any other adverse event, P(impact), or an expectation of impact, $E_{f(x)}$ (impact), the correction factor for the modified probability distribution h(x) may be determined such that the following equation is true:

$$P(\text{impact}) = E_{f(x)}(\text{impact}) = E_{f(x)}\left(\text{impact} * \frac{f(x)}{h(x)}\right) \qquad (1)$$

where $$\frac{f(x)}{h(x)}$$

represents the correction factor. In other words, the delineation (at operation 604) and/or the modification of the distribution (at operation 614) may be conducted such that the correction factor may be a scalar applied to a metric determined at operation 808. In at least one example, the metric may be a likelihood of a binary event, in order to bound the correction factor. The correction factor may be based at least in part on the modification of the distribution. For example, the correction factor may be based at least in part on a reversal 806 required to return the modified distribution to the original distribution. In an example where operation 508 and 514 were iterated multiple times before a first adverse event occurred, the correction factor may be based at least in part on multiple modifications and/or the most recent modified distribution.

At operation 808, example process 800 may comprise determining a metric, such as a likelihood of an occurrence of an adverse event) based at least in part on the correction factor and the simulation(s), according to any of the techniques discussed herein. Although any metric may be calculated and corrected, to give a concrete example, determining a likelihood of an occurrence of an adverse event during operation of the autonomous vehicle may comprise determining an occurrence rate of adverse event(s) in the simulations conducted and/or a number of scenarios simulated before an adverse event occurred in a simulation, which may be used to determine a base metric that doesn't take into consideration the bias introduced by modifying the distribution. The likelihood of the adverse event occurring may be determined as an adverse event occurrence rate per thousand miles operated (e.g., another distance could be used, operation time could be used, etc.), a disengagement rate per thousand miles operated, a posterior probability of the adverse event ever occurring, or the like. The correction factor may be applied to the base metric to determine a final metric to associate with the vehicle or component. The final metric may be used by the validation system to determine whether the vehicle or component passes or fails and/or whether additional modification is necessary to bring the vehicle or component into compliance with a standard. In an additional or alternate example, the simulation results may be used to determine a confidence interval associated with the metric.

A. A method comprising: receiving an instruction to test a component of an autonomous vehicle by simulating operation of the autonomous vehicle based at least in part on providing simulated data as input to the component of the autonomous vehicle; determining a simulated scenario based at least in part on selecting a first set of scenario parameters from among multiple scenario parameter sets, wherein determining the first set of scenario parameters comprises: receiving a first probability distribution associated with different sets of scenario parameters, wherein: the first probability distribution comprises a probability associated with the first set of scenario parameters, the probability indicates a likelihood that the autonomous vehicle will encounter a scenario defined by the first set of scenario parameters during operation of the autonomous vehicle, and the first set of scenario parameters identifies a characteristic of a simulated environment, a simulated object in the environment, and a simulated vehicle associated with the autonomous vehicle; receiving a classification associated with the first set of scenario parameters indicating that the first set of scenario parameters is associated with an adverse event; modifying, based at least in part on the classification, the first probability distribution as a modified distribution, wherein the modified distribution increases a likelihood of an adverse event occurring in a simulated scenario and modifies the probability as a modified probability; and determining, based at least in part on the modified distribution and the modified probability, the first set of scenario parameters from among the different sets of scenario parameters; and simulating a first scenario based at least in part on the first set of scenario parameters, wherein the simulating comprises simulating operation of the simulated vehicle based at least in part on operating a component of the autonomous vehicle using simulated data generated by simulating the first scenario.

B. The method of paragraph A, further comprising: determining that an adverse event occurred during simulation of the first scenario; determining, based at least in part on the modifying the first probability distribution, a correction factor associated with the modified distribution; and determining, based at least in part on the correction factor and the modified distribution, a real-world probability that controlling the autonomous vehicle using the component will result in an impact with an object.

C. The method of paragraph B, further comprising: determining that the real-world probability is less than a threshold probability; and transmitting, to the autonomous vehicle and based at least in part on the probability being less than the threshold probability, at least one of the component or an instruction to control the autonomous vehicle based at least in part on the component.

D. The method of any one of paragraphs A-C, wherein the adverse event comprises at least one of: an overlap of a simulated geometry of the simulated vehicle with a simulated geometry of the simulated object, a shortest distance from the simulated vehicle to the simulated object during a simulation is less than a threshold distance, a predicted time until impact is less than a threshold time, or a deceleration required to avoid impact meets or exceeds a threshold deceleration.

E. The method of any one of paragraphs A-D, wherein modifying the first probability distribution comprises: determining, based at least in part on the classification and another classification associated with another set of scenario parameters, a portion of a parameter space associated with sets of scenario parameters classified as being associated with the adverse event; determining a delineation of the portion of the parameter space; and altering a characteristic of the first probability distribution such that the characteristic is associated with the delineation.

F. The method of paragraph E, wherein altering the characteristic such that the characteristic is associated with the delineation comprises: determining a portion of the delineation closest to a mean of the first probability distribution; and moving a location of the mean of the first probability distribution to a portion of the delineation closest to the location.

G. A system comprising: one or more processors; and a memory storing processor-executable instructions that, when executed by the one or more processors, cause the system to perform operations comprising: simulating operation of a component of a vehicle based at least in part on simulating a first scenario, wherein determining simulation data to simulate the first scenario comprises: receiving a first distribution associated with a parameter space, wherein the parameter space comprises multiple sets of scenario parameters and a first probability of the first distribution is associated with a first set of scenario parameters of the multiple sets of scenario parameters; receiving a classification associated with the first set of scenario parameters indicating that the first set of scenario parameters is associated with an adverse event; modifying, based at least in part on the classification, the first distribution as a modified distribution, wherein modifying the first distribution comprises modifying a component of first distribution to increase a portion of the first distribution that is associated with an adverse event space in the parameter space; and determining, based at least in part on the modified distribution, the first set of scenario parameters from among the multiple sets of scenario parameters defined by the parameter space, wherein simulating the first scenario is based at least in part on the first set of scenario parameters.

H. The system of paragraph G, further comprising: determining, based at least in part on simulating the first scenario, an absence of the adverse event; modifying, based at least in part on simulation data associated with the first scenario and determining that the adverse event did not occur, the modified distribution as a second modified distribution to increase the likelihood of the adverse event occurring in a simulated scenario; determining, based at least in part on the second modified distribution, a second set of scenario parameters; and simulating a second scenario based at least in part on the second set of scenario parameters.

I. The system of either paragraph G or H, further comprising determining that an adverse event occurred during simulation of the first scenario; determining, based at least in part on the modifying the first distribution, a correction factor associated with the modified distribution; and determining, based at least in part on the correction factor and the modified distribution, a second probability indicative of control of the vehicle using the component resulting in an unsafe act.

J. The system of paragraph I, further comprising: determining that the second probability is less than a threshold probability; transmitting, to the vehicle, based on the second probability being less than the threshold probability, at least one of the component or an instruction to control the vehicle based at least in part on the component.

K. The system of any one of paragraphs G-J, wherein the adverse event comprises at least one of: an overlap of a simulated geometry of the vehicle with a simulated geometry of a simulated object, a distance from simulated geometry of the vehicle to a simulated object during a simulation is less than a threshold distance, a time before a simulated overlap of a simulated geometry of the vehicle with a simulated geometry of a simulated object is less than a threshold time, or a deceleration required to avoid overlap of a simulated geometry of the vehicle with a simulated geometry of a simulated object meets or exceeds a threshold deceleration.

L. The system of any one of paragraphs G-K, wherein modifying the first distribution comprises: determining, based at least in part on the classification, a portion of the parameter space associated with sets of scenario parameters classified as being associated with the adverse event; determining a delineation of the portion of the parameter space; and altering a characteristic of the first distribution such that the characteristic is associated with the delineation.

M. The system of paragraph L, further comprising: determining, based at least in part on simulating the first scenario, that the first scenario is invalid, wherein determining the first scenario is invalid comprises: determining that an adverse event occurred before the component initialized or within a time period after the component initialized, or receiving an error code based at least in part on simulating the first scenario; and excluding the first set of scenario parameters from the portion of the parameter space.

N. The system of either paragraph L or M, wherein altering the characteristic such that the characteristic is associated with the delineation comprises: determining a portion of the delineation closest to a mean of the first distribution; and moving a location of a mean of the first distribution to a portion of the delineation closest to the location.

O. A non-transitory computer-readable medium storing processor-executable instructions that, when executed by one or more processors, cause the one or more processors to perform operations comprising: receiving a first distribution associated with a parameter space, wherein the parameter space comprises multiple sets of scenario parameters and a first probability of the first probability is associated with a first set of scenario parameters of the multiple sets of scenario parameters; determining, by a machine-learned model, a classification associated with the first set of scenario parameters indicating that the first set of scenario parameters is associated with an adverse event; modifying, based at least in part on the classification, the first distribution as a modified distribution; determining, based at least in part on the modified distribution, a second set of scenario parameters from among the multiple sets of scenario parameters defined by the parameter space; and simulating a first scenario based at least in part on the second set of scenario parameters, wherein the simulating comprises simulating operation of a vehicle based at least in part on operating a component of the vehicle.

P. The non-transitory computer-readable medium of paragraph O, further comprising: determining, based at least in part on simulating the first scenario, an absence of the adverse event; modifying, based at least in part on simulation data associated with the first scenario and determining that the adverse event did not occur, the modified distribution as a second modified distribution to increase the likelihood of the adverse event occurring in a simulated scenario; determining, based at least in part on the second modified distribution, a third set of scenario parameters; and simulating a second scenario based at least in part on the third set of scenario parameters.

Q. The non-transitory computer-readable medium of either paragraph O or P, further comprising determining that an adverse event occurred during simulation of the first scenario; determining, based at least in part on the modifying the first distribution, a correction factor associated with the modified distribution; and determining, based at least in part on the correction factor and the modified distribution, a second probability that controlling the vehicle using the component will result in an impact with an object.

R. The non-transitory computer-readable medium of any one of paragraphs O-Q, wherein modifying the first distribution comprises: determining, based at least in part on the classification, a portion of the parameter space associated with sets of scenario parameters classified as being associated with the adverse event; determining a delineation of the portion of the parameter space; and altering a characteristic of the first distribution such that the characteristic is associated with the delineation.

S. The non-transitory computer-readable medium of paragraph R, further comprising: determining, based at least in part on simulating the first scenario, that the first scenario is invalid, wherein determining the first scenario is invalid comprises: determining that an adverse event occurred before the component initialized or within a time period after the component initialized, or receiving an error code based at least in part on simulating the first scenario; and excluding the second set of scenario parameters from the portion of the parameter space.

T. The non-transitory computer-readable medium of either paragraph R or S, wherein altering the characteristic such that the characteristic is associated with the delineation comprises: determining a portion of the delineation closest to a mean of the first distribution; and moving a location of a mean of the first distribution to a portion of the delineation closest to the location.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
  receiving an instruction to test a component of an autonomous vehicle by simulating operation of the autonomous vehicle based at least in part on providing simulated data as input to the component of the autonomous vehicle;
  determining a simulated scenario based at least in part on selecting a first set of scenario parameters from among multiple scenario parameter sets, wherein determining the first set of scenario parameters comprises:
    receiving a first probability distribution associated with different sets of scenario parameters, wherein:
      the first probability distribution comprises a probability associated with the first set of scenario parameters,
      the probability indicates a likelihood that the autonomous vehicle will encounter a scenario defined by the first set of scenario parameters during operation of the autonomous vehicle, and
      the first set of scenario parameters identifies a characteristic of a simulated environment, a simulated object in the environment, and a simulated vehicle associated with the autonomous vehicle;
    receiving a classification associated with the first set of scenario parameters indicating that the first set of scenario parameters is associated with an adverse event;

modifying, based at least in part on the classification, the first probability distribution as a modified distribution, wherein the modified distribution increases a likelihood of an adverse event occurring in a simulated scenario and modifies the probability as a modified probability, wherein the modifying is further based at least in part on determining, as a parameterized transformation of the multiple scenario parameter sets, an explicit representation of a parameter space associated with the multiple scenario parameter sets; and determining, based at least in part on the modified distribution and the modified probability, the first set of scenario parameters from among the different sets of scenario parameters; and simulating a first scenario based at least in part on the first set of scenario parameters, wherein the simulating comprises simulating operation of the simulated vehicle based at least in part on operating a component of the autonomous vehicle using simulated data generated by simulating the first scenario.

2. The method of claim 1, further comprising;
determining that an adverse event occurred during simulation of the first scenario;
determining, based at least in part on the modifying the first probability distribution, a correction factor associated with the modified distribution; and
determining, based at least in part on the correction factor and the modified distribution, a real-world probability that controlling the autonomous vehicle using the component will result in an impact with an object.

3. The method of claim 2, further comprising:
determining that the real-world probability is less than a threshold probability; and
transmitting, to the autonomous vehicle and based at least in part on the real-world probability being less than the threshold probability, at least one of the component or an instruction to control the autonomous vehicle based at least in part on the component.

4. The method of claim 1, wherein the adverse event comprises at least one of:
an overlap of a simulated geometry of the simulated vehicle with a simulated geometry of the simulated object,
a shortest distance from the simulated vehicle to the simulated object during a simulation is less than a threshold distance,
a predicted time until impact is less than a threshold time, or
a deceleration required to avoid impact meets or exceeds a threshold deceleration.

5. The method of claim 1, wherein modifying the first probability distribution further comprises: determining, by a machine-learned model based at least in part on the parameterized transformation, a delineation of a portion of a parameter space associated with a subset of the multiple scenario parameter sets that are associated with the classification; and altering a characteristic of the first probability distribution such that the characteristic is associated with the delineation.

6. The method of claim 5, wherein altering the characteristic such that the characteristic is associated with the delineation comprises:
determining a portion of the delineation closest to a mean of the first probability distribution; and moving a location of the mean of the first probability distribution to a portion of the delineation closest to the location.

7. A system comprising:
one or more processors; and
a memory storing processor-executable instructions that, when executed by the one or more processors, cause the system to perform operations comprising:
simulating operation of a component of a vehicle based at least in part on simulating a first scenario, wherein determining simulation data to simulate the first scenario comprises:
receiving a first distribution associated with a parameter space, wherein the parameter space comprises multiple sets of scenario parameters and a first probability of the first distribution is associated with a first set of scenario parameters of the multiple sets of scenario parameters;
receiving a classification associated with the first set of scenario parameters indicating that the first set of scenario parameters is associated with an adverse event;
modifying, based at least in part on the classification, the first distribution as a modified distribution, wherein modifying the first distribution comprises modifying a component of first distribution to increase a portion of the first distribution that is associated with an adverse event space in the parameter space, wherein the modifying is further based at least in part on determining, as a parameterized transformation of the multiple scenario parameter sets, an explicit representation of the multiple scenario parameter sets; and
determining, based at least in part on the modified distribution, the first set of scenario parameters from among the multiple sets of scenario parameters defined by the parameter space,
wherein simulating the first scenario is based at least in part on the first set of scenario parameters.

8. The system of claim 7, wherein the operations further comprise:
determining, based at least in part on simulating the first scenario, an absence of the adverse event;
modifying, based at least in part on simulation data associated with the first scenario and determining that the adverse event did not occur, the modified distribution as a second modified distribution to increase a likelihood of the adverse event occurring in a simulated scenario;
determining, based at least in part on the second modified distribution, a second set of scenario parameters; and
simulating a second scenario based at least in part on the second set of scenario parameters.

9. The system of claim 7, wherein the operations further comprise:
determining that an adverse event occurred during simulation of the first scenario;
determining, based at least in part on the modifying the first distribution, a correction factor associated with the modified distribution; and
determining, based at least in part on the correction factor and the modified distribution, a second probability indicative of control of the vehicle using the component resulting in an unsafe act.

10. The system of claim 9, wherein the operations further comprise:
  determining that the second probability is less than a threshold probability; and
  transmitting, to the vehicle, based on the second probability being less than the threshold probability, at least one of the component or an instruction to control the vehicle based at least in part on the component.

11. The system of claim 7, wherein the adverse event comprises at least one of:
  an overlap of a simulated geometry of the vehicle with a simulated geometry of a simulated object,
  a distance from simulated geometry of the vehicle to a simulated object during a simulation is less than a threshold distance,
  a time before a simulated overlap of a simulated geometry of the vehicle with a simulated geometry of a simulated object is less than a threshold time, or
  a deceleration required to avoid overlap of a simulated geometry of the vehicle with a simulated geometry of a simulated object meets or exceeds a threshold deceleration.

12. The system of claim 7, wherein modifying the first distribution comprises:
  determining, based at least in part on the classification, a portion of the parameter space associated with sets of scenario parameters classified as being associated with the adverse event;
  determining a delineation of the portion of the parameter space; and
  altering a characteristic of the first distribution such that the characteristic is associated with the delineation.

13. The system of claim 12, wherein the operations further comprise:
  determining, based at least in part on simulating the first scenario, that the first scenario is invalid, wherein determining the first scenario is invalid comprises:
    determining that an adverse event occurred before the component initialized or within a time period after the component initialized, or
    receiving an error code based at least in part on simulating the first scenario; and
  excluding the first set of scenario parameters from the portion of the parameter space.

14. The system of claim 12, wherein altering the characteristic such that the characteristic is associated with the delineation comprises:
  determining a portion of the delineation closest to a mean of the first distribution; and
  moving a location of a mean of the first distribution to a portion of the delineation closest to the location.

15. A non-transitory computer-readable medium storing processor-executable instructions that, when executed by one or more processors, cause the one or more processors to perform operations comprising:
  receiving a first distribution associated with a parameter space, wherein the parameter space comprises multiple sets of scenario parameters and a first probability of the first probability is associated with a first set of scenario parameters of the multiple sets of scenario parameters;
  determining, by a machine-learned model, a classification associated with the first set of scenario parameters indicating that the first set of scenario parameters is associated with an adverse event;
  modifying, based at least in part on the classification, the first distribution as a modified distribution, wherein the modifying is further based at least in part on determining, as a parameterized transformation of the multiple scenario parameter sets, an explicit representation of the multiple scenario parameter sets;
  determining, based at least in part on the modified distribution, a second set of scenario parameters from among the multiple sets of scenario parameters defined by the parameter space; and
  simulating a first scenario based at least in part on the second set of scenario parameters, wherein the simulating comprises simulating operation of a vehicle based at least in part on operating a component of the vehicle.

16. The non-transitory computer-readable medium of claim 15, wherein the operations further comprise:
  determining, based at least in part on simulating the first scenario, an absence of the adverse event;
  modifying, based at least in part on simulation data associated with the first scenario and determining that the adverse event did not occur, the modified distribution as a second modified distribution to increase a likelihood of the adverse event occurring in a simulated scenario;
  determining, based at least in part on the second modified distribution, a third set of scenario parameters; and
  simulating a second scenario based at least in part on the third set of scenario parameters.

17. The non-transitory computer-readable medium of claim 15, wherein the operations further comprise:
  determining that an adverse event occurred during simulation of the first scenario;
  determining, based at least in part on the modifying the first distribution, a correction factor associated with the modified distribution; and
  determining, based at least in part on the correction factor and the modified distribution, a second probability that controlling the vehicle using the component will result in an impact with an object.

18. The non-transitory computer-readable medium of claim 15, wherein modifying the first distribution comprises:
  determining, based at least in part on the classification, a portion of the parameter space associated with sets of scenario parameters classified as being associated with the adverse event;
  determining a delineation of the portion of the parameter space; and
  altering a characteristic of the first distribution such that the characteristic is associated with the delineation.

19. The non-transitory computer-readable medium of claim 18, wherein the operations further comprise:
  determining, based at least in part on simulating the first scenario, that the first scenario is invalid, wherein determining the first scenario is invalid comprises:
    determining that an adverse event occurred before the component initialized or within a time period after the component initialized, or
    receiving an error code based at least in part on simulating the first scenario; and
  excluding the second set of scenario parameters from the portion of the parameter space.

20. The non-transitory computer-readable medium of claim 18, wherein altering the characteristic such that the characteristic is associated with the delineation comprises:
  determining a portion of the delineation closest to a mean of the first distribution; and moving a location of a mean of the first distribution to a portion of the delineation closest to the location.

\* \* \* \* \*